(12) United States Patent
Hawthorne

(10) Patent No.: US 6,748,303 B2  
(45) Date of Patent: Jun. 8, 2004

(54) VARIABLE EXCEPTION REPORTING

(75) Inventor: Michael J. Hawthorne, Arlington, TX (US)

(73) Assignee: New York Air Brake Corporation, Watertown, NY (US)

(*) Notice: Subject to any disclaimer, the term of this patent is extended or adjusted under 35 U.S.C. 154(b) by 24 days.

(21) Appl. No.: 10/247,370

(22) Filed: Sep. 20, 2002

(65) Prior Publication Data

US 2004/0059475 A1 Mar. 25, 2004

(51) Int. Cl.[7] .............................................. G06F 19/00
(52) U.S. Cl. .......................... 701/19; 701/35; 340/435; 340/937; 246/169 R; 105/62 R
(58) Field of Search ........................... 701/19, 35, 117, 701/119, 28; 340/825, 936, 937, 435, 456; 246/5, 167 R, 169 R, 122 R, 182 R; 105/62 R, 61

(56) References Cited

U.S. PATENT DOCUMENTS

| | | | |
|---|---|---|---|
| 4,041,283 A | 8/1977 | Mosier | 235/150.2 |
| 4,042,810 A | 8/1977 | Mosher | 235/150.2 |
| 4,181,943 A | 1/1980 | Mercer, Sr. et al. | 246/182 B |
| 4,236,215 A | 11/1980 | Callahan et al. | 324/160 |
| 4,344,364 A | 8/1982 | Nickles et al. | 105/62 R |
| 4,602,335 A | 7/1986 | Perlmutter | 105/61 |
| 4,735,385 A | 4/1988 | Nickles et al. | 246/182 R |
| 5,364,047 A | * 11/1994 | Petit et al. | 246/112 R |
| 5,550,738 A | 8/1996 | Bailey et al. | 340/456 |
| 5,740,547 A | * 4/1998 | Kull et al. | 701/19 |
| 5,758,299 A | 5/1998 | Sandborg et al. | 701/29 |
| 5,828,979 A | * 10/1998 | Polivka et al. | 701/117 |
| 5,867,801 A | * 2/1999 | Denny | 701/35 |
| 5,893,893 A | 4/1999 | Holt et al. | 701/35 |
| 5,978,717 A | * 11/1999 | Ebersohn et al. | 701/19 |
| 6,226,577 B1 | 5/2001 | Yeo | 701/35 |
| 2003/0080878 A1 | * 5/2003 | Kirmuss | 340/936 |

FOREIGN PATENT DOCUMENTS

| | | |
|---|---|---|
| EP | 0 257 662 A2 | 3/1988 |
| EP | 0 539 885 A2 | 5/1993 |
| EP | 0 755 840 A1 | 1/1997 |
| EP | 0 114 633 A1 | 8/1998 |
| GB | 2 188 464 A | 9/1987 |
| WO | WO 90/03622 | 4/1990 |

OTHER PUBLICATIONS

Orsillo, James. *Simulation Applications For the Digital Railroad*, ORTHSTAR, Inc. (Sep. 2002).

* cited by examiner

Primary Examiner—Thomas G. Black  
Assistant Examiner—Tuan C To  
(74) Attorney, Agent, or Firm—Barnes & Thornburg

(57) ABSTRACT

A method of analyzing train operational data recorded during each run of a train and transferred to a processing station. Operational and informational parameters are derived from the recorded operational data for each run. The operational and identification parameters and the corresponding operational data are stored as a standard database record for each run. The operational parameters are compared to selected exception values and the variance of the comparison are stored with the standard operational database record for each run. A search is then performed of the stored standard database records based on one or more of operational parameter, identification parameter, operational data and variance.

21 Claims, 7 Drawing Sheets

FIG. 3

| OP. PARAMETERS | | SELECTED EXCEPTIONS | LIMIT VALUE | EDIT VALUE |
|---|---|---|---|---|
| | | | | DEFAULT |
| | | | | DEFAULT ALL |
| UNDESIRED RELEASES | ADD >> | SPEED LIMIT | 35 KLBS | |
| POWER BRAKING | << REMOVE | RUN IN FORCE | 125 KLBS | |
| EXCESSIVE FUEL USE | ADD ALL | RUN OUT FORCE | 125 KLBS | |
| EXCESSIVE BRAKE RDN | REMOVE ALL | STEADY STATE DRAFT | 300 KLBS | |
| | | STEADY STATE BUFF | 300 KLBS | CREATE REPORT |

FIG. 4

DATE: MON MAR 20 14:32:58 2000

OPERATOR: KEN NICKLES

ANALYSIS START: 03/20/00 16:01:01 MP 45.000
ANALYSIS STOP: 03/20/00 18:42:28 MP 1.999

PROFILE: MAINLINE

HEAD-END DUTY CYCLE

|       | DURATION | DISTANCE (MILES) | FUEL (GALLONS) | ENTRIES |
|-------|----------|------------------|----------------|---------|
| IDLE  | 0:10:39  | 3.892            | 1.67           | 4       |
| RUN 1 | 0:23:16  | 6.062            | 9.34           | 9       |
| RUN 2 | 0:07:20  | 1.693            | 7.75           | 24      |
| RUN 3 | 0:11:08  | 2.44             | 23.75          | 40      |
| RUN 4 | 0:10:37  | 2.177            | 31.11          | 33      |
| RUN 5 | 0:07:03  | 1.409            | 27.33          | 21      |
| RUN 6 | 0:11:56  | 2.404            | 58.17          | 19      |
| RUN 7 | 0:20:38  | 4.212            | 133.03         | 13      |
| RUN 8 | 0:16:18  | 3.244            | 128.34         | 4       |
| DB    | 0:42:29  | 15.462           | 20.11          | 1       |
|       |          |                  |                |         |
| TOTAL | 2:41:28  | 42.995           | 440.57         | 168     |

TOTAL ENERGY DEMAND

| CATEGORY          | DEMAND (HP-HRS) | FUEL (GALLONS) |
|-------------------|-----------------|----------------|
| ACCELERATION      | 1320.65         | 25.55          |
| AIR BRAKE         |                 |                |
| SLOW DOWNS (3)    | 1064.53         | 20.6           |
| BALANCING GRADE   | 11195.78        | 216.6          |
| POWER BRAKING     | 0               | 0              |
| DYNAMIC BRAKE     |                 |                |
| SLOW DOWNS (3)    | 311.47          | 7.66           |
| BALANCING GRADE   | 2259.36         | 55.59          |
| POWER BRAKING     | 0               | 0              |
| CURVE RESISTANCE  | 1188.99         | 23             |
| GRADE RESISTANCE  | -13977.3        | 0              |
| ROLLING RESISTANCE| 3439.28         | 66.54          |
| IDLE FUEL         | 0               | 25.03          |
|                   |                 |                |
| TRACTION          | 6798.66         | 440.57         |

FIG. 6a

ENERGY USAGE

| TRAIN HP-HRS | 2911.29 | | |
|---|---|---|---|
| | | | |
| ENERGY BREAKDOWN | | TE | DBE |
| LOCO MEASURED HP-HRS | 4227.82 | 6798.66 | -2570.83 |
| LOCO THEORETICAL HP-HRS | 4231.12 | 6798 | -2566.88 |
| ACCEL CALCULATED HP-HRS | 1320.65 | | |
| ACCEL MEASURED HP-HRS | 183.99 | | |
| ACCEL CLC-MSD HP-HRS | 1136.66 | | |

RUN IN / OUT FREQUENCIES

| LOW RANGE | UNIT | | HIGH RANGE | UNIT | FREQUENCY |
|---|---|---|---|---|---|
| 0 | KLB | TO | 25 | KLB | 2837 |
| 25 | KLB | TO | 50 | KLB | 2130 |
| 50 | KLB | TO | 75 | KLB | 843 |
| 75 | KLB | TO | 100 | KLB | 231 |
| 100 | KLB | TO | 125 | KLB | 14 |
| 125 | KLB | TO | 150 | KLB | 0 |
| 150 | KLB | | | | 0 |

CONSIST SUMMARY

| CATEGORY | VALUE | UNIT |
|---|---|---|
| LOCOMOTIVES | 3 | LOCOMOTIVES |
| TOTAL HP | 9000 | HP |
| CARS | 150 | CARS |
| LOADS | 150 | LOADED CARS |
| LOAD / CAR | 102 | TONS |
| HIGH PRESSURE RETAINERS | 0 | RETAINERS |
| LOW PRESSURE RETAINERS | 0 | RETAINERS |
| SLOW DIRECT RETAINERS | 0 | RETAINERS |
| NET WT | 19350 | TONS |
| LADING WT | 15405 | TONS |
| GROSS WT | 19965 | TONS |
| LENGTH | 4667 | FEET |
| HP / TON | 0.45 | HP / TON |
| NET / BRK | 26.2% | |
| WT / BRK | 130 | TONS |

FINAL SCALE FACTORS

| FACTOR | VALUE | UNIT |
|---|---|---|
| ADHESION | 40% | |
| BRAKE EFFICIENCY | 48% | |
| CURVE EFFICIENCY | 100% | |
| DYN BRK EFFICIENCY | 106% | |
| LEAKAGE | 1 | PSI / MIN |
| ROLL RES EFFICIENCY | 100% | |
| SPEED SCALE FACTOR | 100.00% | |
| TE TBL EFFICIENCY | 97% | |
| BRAKE CHARGE FACTOR | 100% | |

FIG. 6b

VARIABLE EXCEPTION REPORTING

BACKGROUND AND SUMMARY OF THE INVENTION

The present invention relates generally to an analysis of train operational data from a train during a run, and more specifically, to the processing of the data and making it available for further analysis.

Operational data is usually collected during a run on the train. This has been analyzed using various methods and produced information in strip charts and other various forms of reports. The information is then stored and accessed individually and analyzed. Historically, there has been only limited ability to search the information based on given criteria for further analysis or reports. To make operational analysis even more difficult, railroad imposed operating constraints will vary day to day based on work crews, track conditions, etc. An operational manager may desire to analyze train runs that were exposed to specific operating constraints to ensure rules compliance and optimal performance. Since such constraints vary day to day, the manager needs an efficient way to define the constraints and sift through a large amount of data to determine rules compliance and performance level.

The present invention provides a method of preprocessing the data to allow it to be searched and further analyzed to an arbitrary user designed criteria.

The present invention is a method of analyzing train operational data collected onboard a train. The train operational data is recorded during each run of a train and transferred to a processing station. Operational and informational parameters are derived from the recorded operational data for each run. The operational and identification parameters and the corresponding operational data are stored as standard database records, one for each run in a database. The operational parameters are compared to selected exception values and the variance of the comparison are stored with the standard operational database record for each run. A search can then be performed of the stored standard database records based on one or more of operational parameter, identification parameter, operational data and variance, and the results are provided. The processing of the operational data and creation of a standard database allow for a most efficient search and analysis.

Preferably, each standard database record is sorted into segments related to an identification parameter and stored. The identification parameter includes one or more geographic locations, geographic features, crew, crew activities, operational constraints, train type, and consist. The operational parameters may include one or more of fuel consumption, in-train forces, time to destination, speed limit adherence, air brake preference and dynamic brake preference. The process further includes tuning variables of the derivation using the recorded operational data and storing the operational and identification parameters after the tuning. The variables to be tuned may include one or more of curve resistance efficiency, weight of the train, rolling resistance efficiency, air brake efficiency, dynamic brake efficiency, propulsion system efficiency and number of retainer sets. The tuned variables are stored with the standard data and with the corresponding parameters and data.

The search criteria is displayed with a first list of database records which meet the search criteria and a second list of one or more database records selected from those that meet the criteria and are to be processed. Also, a first list of operational parameters which can be compared are displayed with a second list of selected parameters to be prepared with their exception values.

Operational constraints of the run may be inputted and used to derive an optimal performance prediction of the run under analysis. The derivation includes deriving operational and identification parameters from the recorded data and the operational constraints. The operational constraints are stored in the standard database with the corresponding parameters and data. A target database of preferred operation data from the recorded operational data based on defined goals is derived. The target database with the standard database of the run is stored as a record. The defined goals may include weighting of operational parameters and limits for operational data. The operational parameters to be weighted include one or more of fuel consumption, in-train forces, time to destination, speed limit adherence, air brake preference and dynamic brake preference. The limits for operational data include one or more of steady state forces, slack action, speed limit and stall speed.

The initial processing to create the standard database record is preferably performed automatically upon receipt of operational data for a new run. Also, the transfer of the operational data is preferably automatic at the end of a run. It may also be performed on a playback system.

Other objects, aspects and novel features of the present invention will become apparent from the following detailed description of the invention when considered in conjunction with the accompanying drawings.

BRIEF DESCRIPTION OF THE DRAWINGS

FIG. 3 is a view of a screen for search criteria of the databases according to the present invention.

FIG. 4 is a screen of exception selection according to the principles of the present invention.

FIGS. 6a and 6b show a report according to the principles of the present invention.

DETAILED DESCRIPTION OF THE PREFERRED EMBODIMENTS

Figure 1:
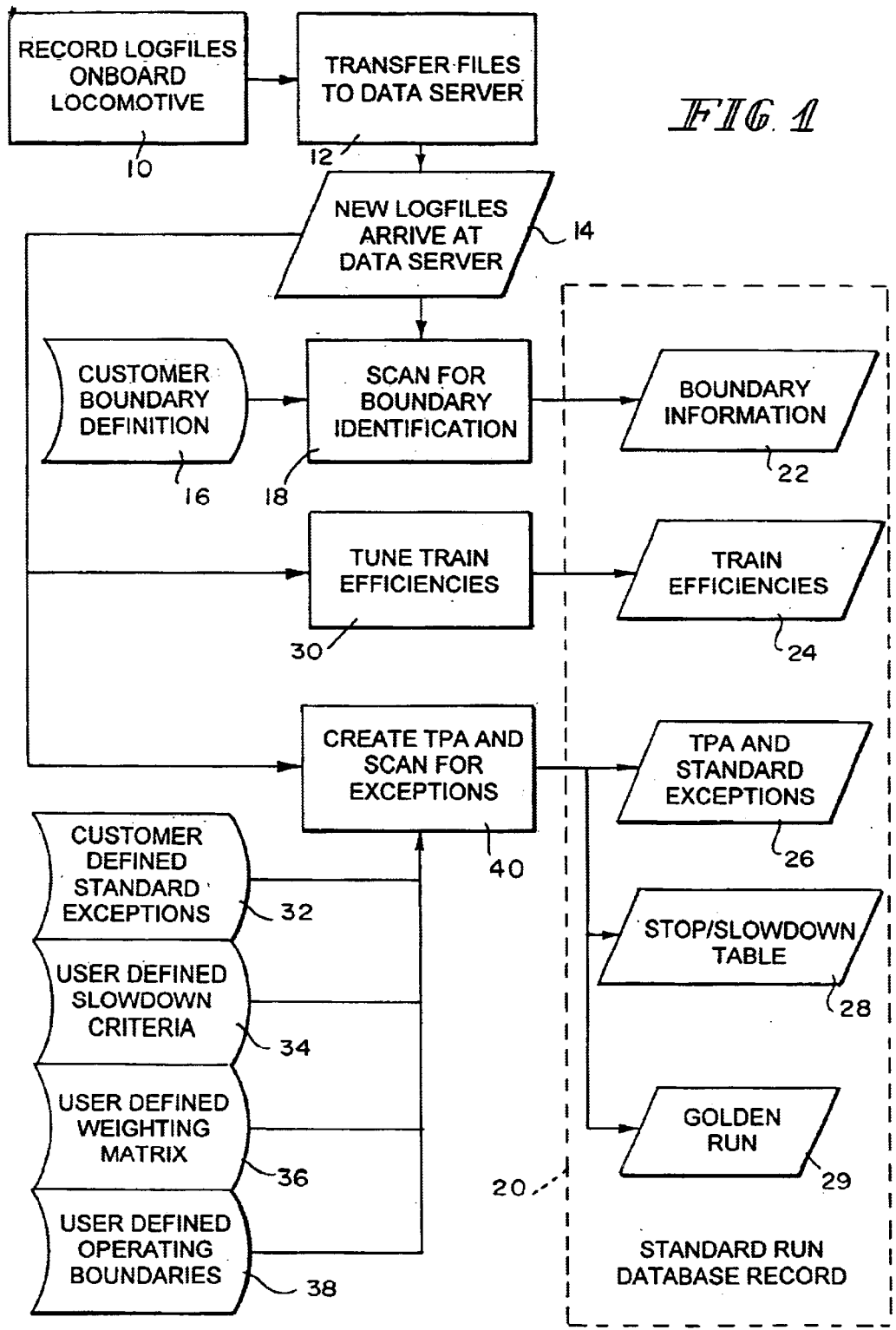
FIG. 1 is a flow chart of the processing of train operational data into a standard database according to the principles of the present invention.

The acquisition, processing of train operational data collected during a run, storing and subsequently sorting and using this information will be described. In FIG. 1, the data is recorded at 10 on a train in an event recorder as logfiles, for example, and includes train operational data during a run. This information is downloaded at 12 using well known means to a data server at 14. A preferable method is for the on-board computer to automatically transfer the operational data file to a data server via wireless communication. This may be done by the onboard computer system automatically contacting a data server when in range and determining a file to be transferred wirelessly. An example of such a system is described in U.S. patent application Ser. No. 09/404,826 filed Sep. 24, 1999. This is but an example and other methods of transfers may be used.

The operational data includes one or more of propulsion system status, pneumatic brake system status, a live GPS feed and other ancillary locomotive status information. Operational identification parameters are derived from the recorded operational data. The identification parameters may include one or more of geographic location, geographic feature, crew, crew activities, operational restraints and consist information. The operational parameters may include one or more of fuel consumption, in-train forces, time to destination, speed limit adherence, air brake preference and dynamic brake preference.

The customer or railroad will provide a list of sort identifications (IDs) at 16. Typically, these would be natural boundary definitions for finding operational limits. These would be, for example, subdivisions, loaded or empty movements, crew change points, etc. Using this sort ID, the system will automatically scan at 18 through the log or data file sets to identify where the segment boundaries defined by the customer are located and generate a boundary report at 22. The report will be used to select one or more segments to be analyzed. The record describes the sort identification or boundary and will include trajectory information describing the state of train at that boundary including, for example, speed and acceleration. The operational and identification parameters and the corresponding operational data from the train is stored as a standard database record 20 for each run.

Next, the playback system, for example, a LEADER Playback system, will analyze the files or database records between the designated boundaries to determine the efficiencies of the operational variables for that particular run at 30. These operational variables may include curve resistance, weight of the train, rolling resistance efficiency, air brake efficiency, dynamic brake efficiency, propulsion system efficiency and number of retainers set on the train. The tuned efficiencies 24 will be added or appended to the standard database record 20 for that run such that other utilities may be used for data processing or have access to the tuned efficiencies.

The railroad will provide a list of standard operational parameters and an acceptable value for each parameter at 32. This list is known as exception trigger point values, which, when exceeded by the associated parameter, generates an exception event. The operational parameters may include fuel consumption, in-train forces, time to destination, speed limit adherence, air brake affinity, dynamic brake affinity, etc. An example of a user interface is illustrated in FIG. 4 and will be discussed below.

The system will then scan for exceptions and create a train performance analysis (TPA) report at 40. The system will play back the log file or data sets, effectively recreating the run from the train dynamic standpoint. The system will monitor a list of operational parameters as the train moves over the territory in the playback and create a data record at 26 of any exception compared to the list of identified selected exception of values. The data record will include parameter, value, location and time of exception. An overall standard TPA report will be generated for each trip for each segment the boundaries played and become part of the standard run database record 20.

The railroad may also provide either a description of an acceptable slow down event or a list of actual slow down zones at 34 for each trip to define whether a slow down could have been avoided and therefore, fuel saved. If the slow down could have been avoided, then the analysis would so indicate, and the database record would be updated to reflect such. All slow down events that are within the control of the engineer will be identified as fuel saving opportunities. The system will focus on how better train handling could have achieved the desired goal, such as to reduce fuel consumption, reduce in-train forces and/or reduce time to destination. If the slow down is beyond the engineer's control, it will not be identified as a penalty and the analysis will be given a credit on the run.

Based on the above analysis at 40, a table of stop and slow down events at 28 will be generated in a defined format and appended to the associated standard database record 20. Along with each event, a TPA will be generated for the portion of the analysis associated with the event. This TPA 28 will be referred to as a micro-TPA since it does not cover the entire run.

A golden or target run may be created as is a golden run TPA report. It begins with the railroad providing a weighting matrix 36 which defines the emphasis placed on various goals to improve operation. This matrix may emphasize fuel consumption and in-train force management without concern for time and destination. Air brake and dynamic brakes may be used without preference. The speed limit will be obeyed at all times. The railroad or user will also define operating constraints or boundaries at 38. This will play a role in finding a list of exceptions as defined above and provide an envelope of operation for the golden run creation. These will include, as previously stated, steady state forces, slack actions, speed limit and stall speed. The system will automatically create a TPA at 40 to maximize performance as defined by the weighing matrix and operating within the constraints. A golden run output record 29 is provided as part of the standard database record 20 for further analysis. All three of the TPA reports are stored together at 26 in FIG. 1.

The method may be performed on a LEADER System available from New York Air Brake Corporation of Watertown, N.Y., and described in U.S. Pat. No. 6,263,266. Also, the description of creating a golden or target run is described in U.S. Pat. No. 6,332,106.

The preceding process is preferably performed automatically whenever a new set of data logs or train operational data is received for a run. All resulting reports and database records will be published or stored together upon completion of processing.

The user interface includes an initial screen or LEADER Display, which provides the ability for segment selection, analysis configuration and mode. Under segment selection, there is edit selection. Under analysis configuration, there is save current analysis, save as, open, configure and edit exceptions. Under the mode, it can be a LEADER Playback, a brush chart or batch processing.

Figure 2:
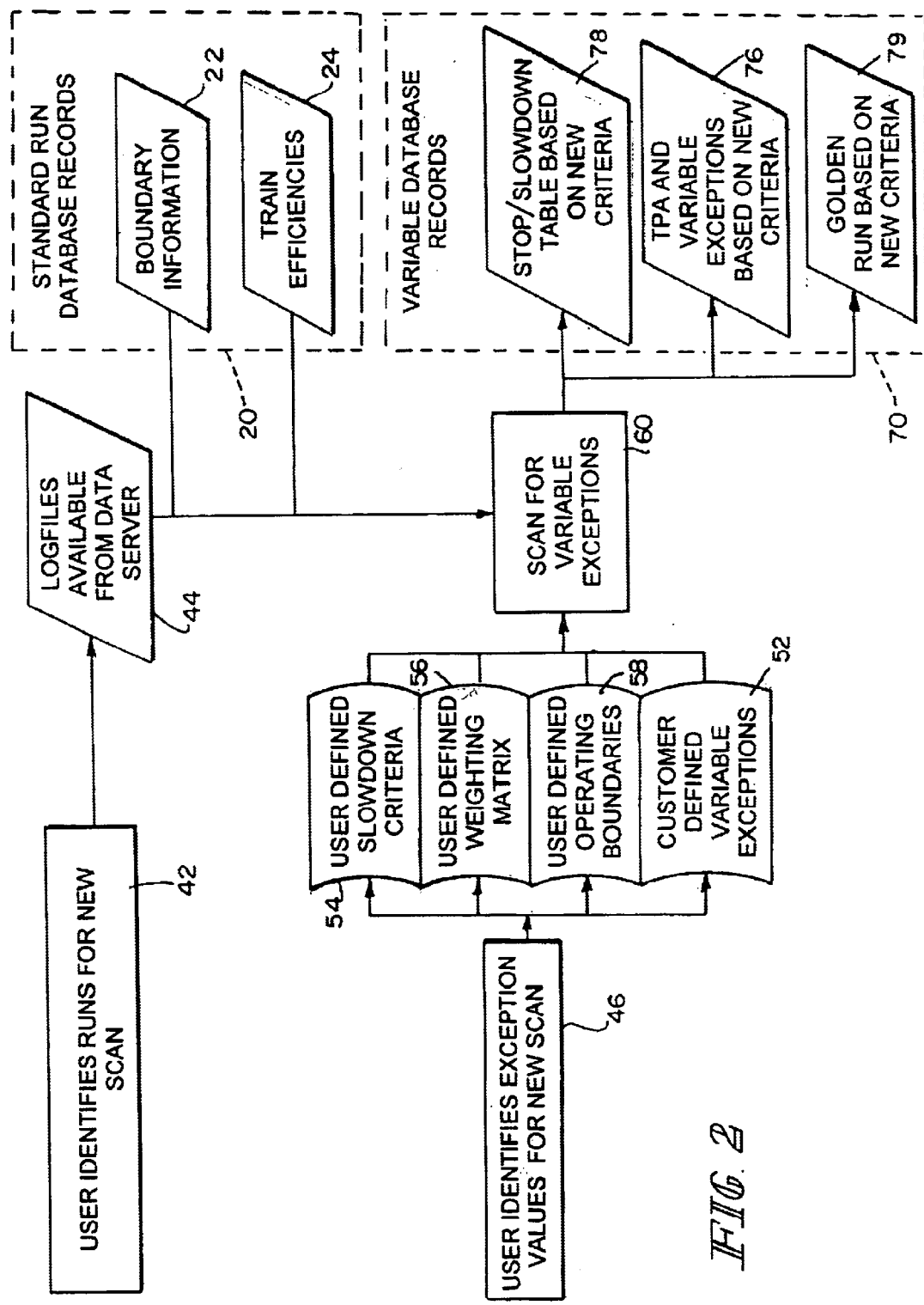
FIG. 2 is a flow chart of the processing of train operational data into a variable exception database according to the principles of the present invention.

The records created in the process of FIG. 1 are considered a standard database 20. FIG. 2 shows a method of processing the standard database with new exceptions to create variable database records and reports from raw standard database records.

Analysis segment selection is activated by the user. The user will identify or select at 42 the train and run to be played back by creating a filter that will successfully reduce the runs available for selection. This selection will create a group of runs for analysis by allowing the user to select, for example, segment and data range of interest. The list shall use run segments to identify and distinguish each trip. The filters may include start of range, including start date, train number and segment identifier; the end of range including end date, train number and segment; and the operator. The user will have the option of selecting a single run for manual analysis and then selecting a specific location by selecting a parameter, for example, mile post, a segment, beginning of a subdivision or time of day.

Figure 3:
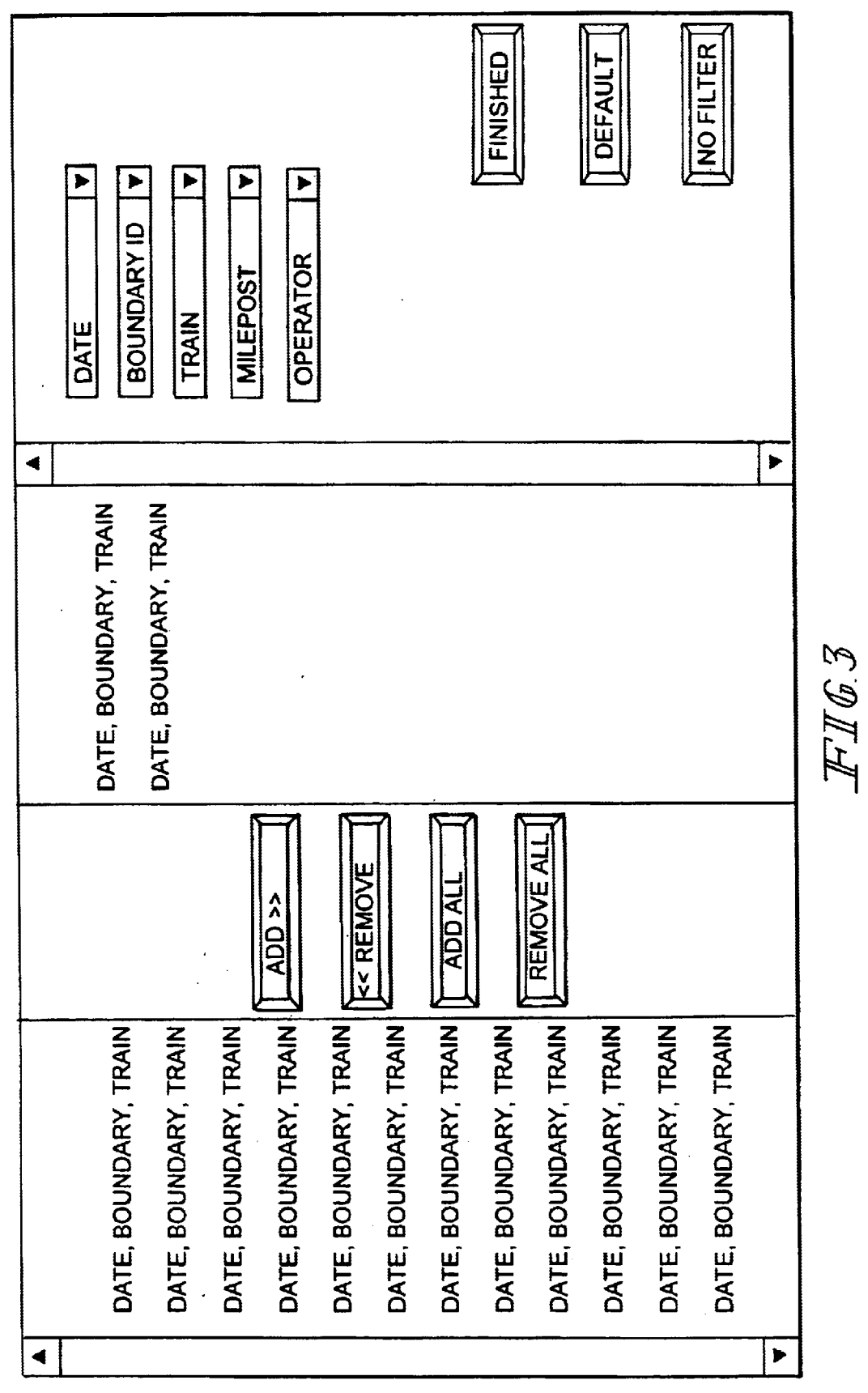

A typical user interface for the analysis selection is illustrated in FIG. 3. This screen is divided into two section. The section on the right allows the user to select filter parameters that will filter the number of segments listed on the left side of the display. The more specific the filter criteria, the smaller the list will be to choose from. Alternatively, the user can select default values or no filter. The left section will present two lists separated by command buttons. The list on the far left will be all the data segments that meet the filter criteria. The command button will allow the user to move selected segments to or from the analysis target list of the second list. When done, the finished button is pressed. This results in the selected logfiles available from the data server at 44 in FIG. 2.

Another user selection interface is illustrated in FIG. 4. The user at 46 in FIG. 2 will be able to define which operational parameters or exception values at 52 of FIG. 2 will be monitored and the level or value at which the exception will be identified for the filtered list of signals identified for a new scan at 60 in FIG. 2. The exception screen is divided into three data selection columns and a number of command buttons. The left-most column is a list of operational parameters which can be monitored. A parameter or parameters will be selected and added to the selection list. The user will be able to select a group of operational parameters from the left column and add them to the monitored list on the right. Initially, monitored values will be defaulted to values as defined by the railroad in creating the standard exception database adjustment achieved by the operator. When the user has completed his definition of the desired report, the create report button is pressed, and the logfile data from 44 of FIG. 2 is reprocessed at 60 in FIG. 2 to search for the exceptions as defined by the new criteria at 52 in FIG. 2.

This results in the customer-defined variable exceptions at 52 in FIG. 2. A scan of the logfiles from 44 using the customer-defined variable exceptions 52 is performed at 60. The scan is conducted using the boundary information 22 and train efficiencies 24 from the standard run and database records 20. The results are a variable exception database record 76. The record 76 is stored and may be displayed to the user.

Similarly, the user at 46 may identify new slowdown criteria at 54, user defined weighting matrix at 56 and user defined operating boundaries at 58 to perform new scans at 60 to produce the new stop/slowdown table at 78 and the golden run record at 79 in the variable database record 70.

Figure 5:
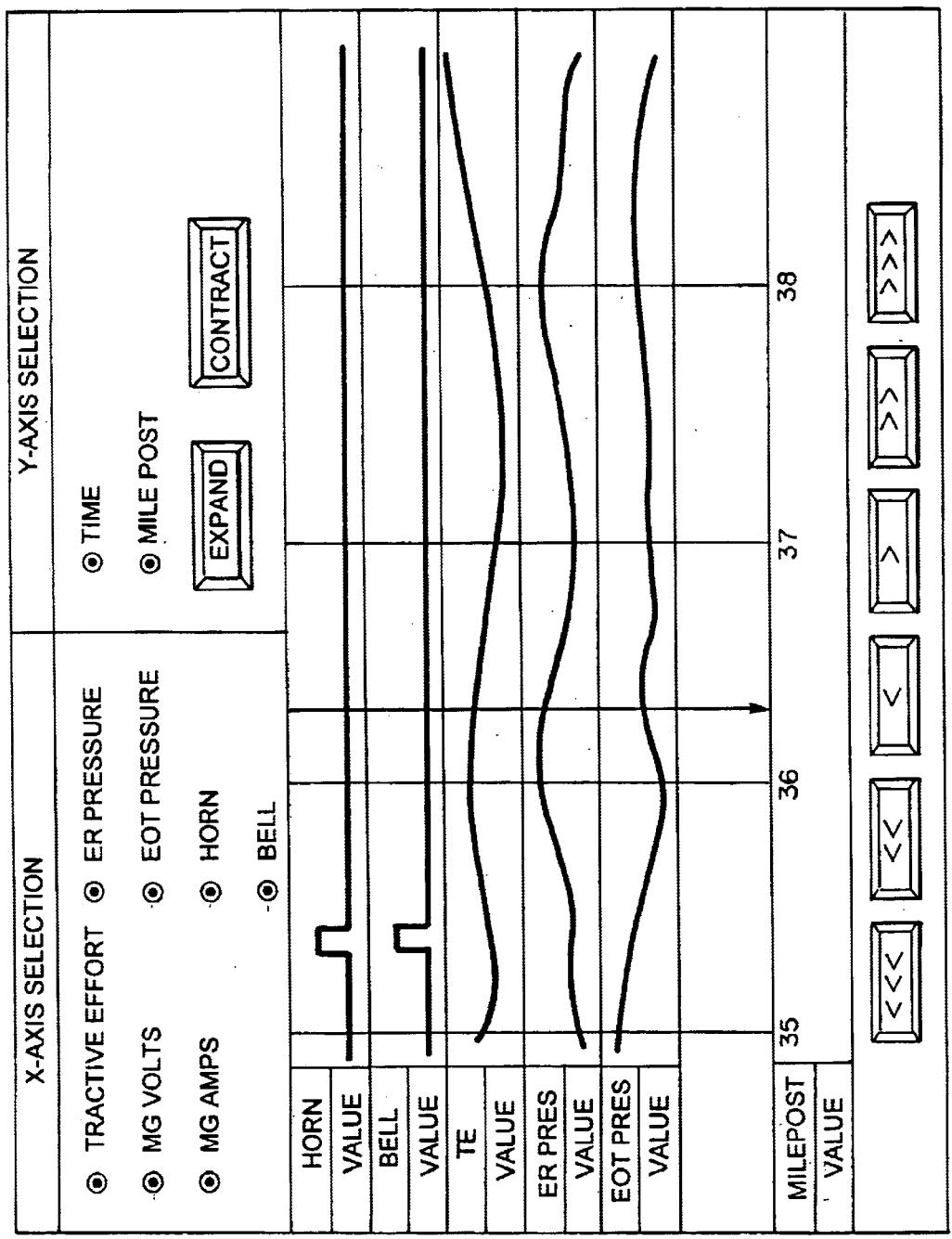
FIG. 5 is a screen illustrating a report according to the principles of the present invention.

The reports or information as a result of the analysis may be viewed in a divisional event recorder format. For example, as shown in FIG. 5, a brush chart view is capable of being presented. Alternatively, a report may be generated and/or displayed. A typical report is shown in FIG. 6.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A method of analyzing train operational data from a train, the method comprising:

recording train operational data during each run of a train;

transferring the recorded operational data to a processing station;

deriving operational and identification parameters from the recorded operational data of each run;

storing the operational and identification parameters and the corresponding operational data as a standard database record for each run;

comparing the operational parameters to selected exceptions values;

storing variance of the comparison with the standard database record for each run;

searching the stored standard database records based on one or more of operational parameter, identification parameter, operational data and variance; and providing the results of the search.

2. The method according to claim 1, including sorting and storing each standard database record into segments relating to an identification parameter.

3. The method according to claim 2, wherein the identification parameters include one or more of geographic location, geographic feature, crew, crew activities, operational constraints, train type, and consist.

4. The method according to claim 1, wherein the operational parameters include one or more of fuel consumption, in-train forces, time to destination, speed limit adherence, air brake preference and dynamic brake preference.

5. The method according to claim 1, including tuning variables of the derivation using the recorded operational data and storing the operational and identification parameters after the tuning.

6. The method according to claim 5, wherein the variables to be tuned include one or more of curve resistance efficiency, weight of train, rolling resistance efficiency, air brake efficiency, dynamic brake efficiency, propulsion system efficiency, and number of retainers set.

7. The method according to claim 5, including storing the tuned variables in the standard database record with the corresponding parameters and data.

8. The method according to claim 1, including inputting train data of the train making the run; performing the deriving using the recorded operational data and train data; and storing the train data in the standard database record with the corresponding parameters and data.

9. The method according to claim 1, including displaying the search criteria, a first list of the database records which meet the criteria and a second list of one or more database records selected, from those that meet the criteria, to be processed.

10. The method according to claim 1, including displaying a first list of operational parameters which can be compared, and a second list of selected operational parameters to be prepared and their selected exception level trigger values.

11. The method according to claim 1, including inputting operational constraints of the run; deriving operational and identification parameters from the recorded operational data and the operational constraints; and storing the operational constraints in the standard database record with the corresponding parameters and data.

12. The method according to claim 1, including deriving a target database of target operational data from the recorded operational data based on defined goals; and storing the target database with the standard database record for the run.

13. The method according to claim 12, wherein defined goals includes weighting of operational parameters and limits for operational data.

14. The method according to claim 13, wherein the operational parameters to be weighted include one or more of fuel consumption, in-train forces, time to destination, speed limit adherence, air brake preference and dynamic brake preference.

15. The method according to claim 13, wherein the limits for operational data include one or more of steady state forces, slack action, speed limit, and stall speed.

16. The method according to claim 1, wherein at least the deriving parameter, operational parameter and identification parameter steps are performed automatically upon receipt of operational data for a new run.

17. The method according to claim 16, wherein the transferring is performed automatically at the end of a run.

18. The method according to claim 1, wherein the transferring is performed automatically at the end of a run.

19. The method according to claim 1, wherein the deriving, storing, comparing and storing steps are performed automatically upon receipt of operational data for a new run.

20. The method according to claim 1, wherein the method is performed on a playback system.

21. The method according to claim 1, including selecting new exception values and selecting at least one identification parameter; and then performing the comparing, storing, searching and reporting of the identified parameter using the new exception values.

* * * * *